US011955074B2

(12) United States Patent
Kim et al.

(10) Patent No.: US 11,955,074 B2
(45) Date of Patent: Apr. 9, 2024

(54) ELECTRONIC DEVICE AND METHOD FOR CALIBRATING IMAGE DATA IN ELECTRONIC DEVICE

(71) Applicant: Samsung Electronics Co., Ltd., Suwon-si (KR)

(72) Inventors: Seonghun Kim, Suwon-si (KR); Hyunchul Oh, Suwon-si (KR); Kwangtaek Woo, Suwon-si (KR); Donghoon Noh, Suwon-si (KR); Jinwan An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 191 days.

(21) Appl. No.: 17/570,275

(22) Filed: Jan. 6, 2022

(65) Prior Publication Data

US 2022/0262308 A1 Aug. 18, 2022

Related U.S. Application Data

(63) Continuation of application No. PCT/KR2021/019820, filed on Dec. 24, 2021.

(30) Foreign Application Priority Data

Feb. 15, 2021 (KR) ........................ 10-2021-0019737

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2320/043* (2013.01);
(Continued)

(58) Field of Classification Search
None
See application file for complete search history.

(56) References Cited

U.S. PATENT DOCUMENTS 10,204,592 B1 * 2/2019 Trim .................... G06F 1/1601
2007/0232336 A1   10/2007 Kim et al.
(Continued)

FOREIGN PATENT DOCUMENTS

CN    110808006 A    2/2020
CN    110956924 A    4/2020
(Continued)

OTHER PUBLICATIONS

International Search Report and Written Opinion of the International Searching Authority dated Mar. 25, 2022, in connection with International Application No. PCT/KR2021/019820, 12 pages.
(Continued)

*Primary Examiner* — Joni Hsu

(57) ABSTRACT

An electronic device includes a first display driver configured to control a first display, a second display driver configured to control a second display, and a processor. The processor is configured to: if screen switching is detected while displaying first image data on the first display using a first pixel value, produce a first calibration value based on the difference between the first pixel value for display on the first display and a second pixel value for display on the second display; apply the first calibration value to the second pixel value so as to produce a third pixel value corresponding to the first pixel value; and control the second display driver so as to display the first image data on the second display using the third pixel value. Various other embodiments may be provided.

20 Claims, 8 Drawing Sheets

(52) U.S. Cl.
CPC ............... *G09G 2320/0666* (2013.01); *G09G 2320/0693* (2013.01)

(56) References Cited

U.S. PATENT DOCUMENTS

| | | | |
|---|---|---|---|
| 2008/0301675 A1* | 12/2008 | Cromer | G06F 9/45533 718/1 |
| 2015/0242178 A1 | 8/2015 | Cho et al. | |
| 2016/0284272 A1 | 9/2016 | Her et al. | |
| 2017/0352310 A1 | 12/2017 | Kim et al. | |
| 2018/0018929 A1 | 1/2018 | Xun et al. | |
| 2018/0330695 A1 | 11/2018 | Baar et al. | |
| 2019/0080656 A1 | 3/2019 | Herranz et al. | |
| 2019/0189050 A1 | 6/2019 | Choi et al. | |
| 2020/0035194 A1 | 1/2020 | Lee | |
| 2020/0193902 A1* | 6/2020 | Hsu | G09G 3/3406 |
| 2021/0096730 A1* | 4/2021 | Greenebaum | G06F 3/04842 |
| 2021/0233491 A1 | 7/2021 | Lee | |
| 2022/0343845 A1 | 10/2022 | Wu et al. | |

FOREIGN PATENT DOCUMENTS

| | | |
|---|---|---|
| CN | 112562587 A | 3/2021 |
| JP | 2020-021031 A | 2/2020 |
| KR | 10-0753397 B1 | 8/2007 |
| KR | 10-2017-0137456 A | 12/2017 |
| KR | 10-2019-0071043 A | 6/2019 |
| KR | 10-2019-0081809 A | 7/2019 |
| KR | 10-2020-0013823 A | 2/2020 |
| KR | 10-2020-0046875 A1 | 5/2020 |
| WO | 2020004704 A1 | 1/2020 |

OTHER PUBLICATIONS

Request for the Submission of an Opinion dated Oct. 30, 2023, in connection with Korean Application No. 10-2021-0019737, 20 pages.

\* cited by examiner

ELECTRONIC DEVICE AND METHOD FOR CALIBRATING IMAGE DATA IN ELECTRONIC DEVICE

CROSS-REFERENCE TO RELATED APPLICATIONS

This application is a continuation of International Application No. PCT/KR2021/019820 filed on Dec. 24, 2021, which claims priority to Korean Patent Application No. 10-2021-0019737, filed on Feb. 15, 2021, in the Korean Intellectual Property Office, the disclosures of which are herein incorporated by reference in their entirety.

BACKGROUND

1. Field

The disclosure relates to an electronic device and a method of calibrating pixel data by an electronic device.

2. Description of Related Art

As information-oriented society develops and various types of portable electronic devices such as mobile terminals, notebook computers, or the like, are developed, demands for a display device applicable thereto are increasing.

As one of the examples, an OLED display device which uses an organic light emitting diode (OLED) is utilized.

If a plurality of display devices (e.g., a plurality of OLED display devices) are included in an electronic device, a calibrating algorithm for the display devices may be implemented. However, the damage of a pixel over a usage time may be different for each display device.

SUMMARY

Accordingly, if image data being displayed in a first display device among the plurality of display devices is switched to be displayed in a second display device as screen switching is performed, the image data may be displayed on the second display in a color different from when the image data is displayed in the first display device.

In accordance with an aspect of the disclosure, an electronic device may include: a first display driver configured to control a first display; a second display driver configured to control a second display; and a processor, configured to: detect screen switching while displaying first image data on the first display, wherein the displaying of the first image data on the first display includes using a first pixel value, in response to the detection, produce a first calibration value based on a difference between the first pixel value for display on the first display and a second pixel value for display on the second display, produce a third pixel value corresponding to the first pixel value by applying the first calibration value to the second pixel value, and control the second display driver so as to display the first image data on the second display using the third pixel value.

In accordance with an aspect of the disclosure, a method of calibrating pixel data by an electronic device may include: detecting, by a processor of the electronic device, screen switching while displaying first image data on a first display, wherein the displaying of the first image data on the first display includes using a first pixel value; in response to the detection, producing, by the processor, a first calibration value based on a difference between a first pixel value for display on a first display and a second pixel value for display on a second display; producing, by the processor, a third pixel value corresponding to the first pixel value by applying the first calibration value to the second pixel value; and controlling, by the processor, the second display driver, so as to display the first image data on the second display using the third pixel value.

According to various embodiments, although the damage of a pixel over a usage time is different for each display device, image data which was displayed in a first display device may be displayed in a second display with the same color sense when the same image data displayed in the first display device among the plurality of display devices of an electronic device is switched to be displayed in the second display device as screen switching is performed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Figure 1:
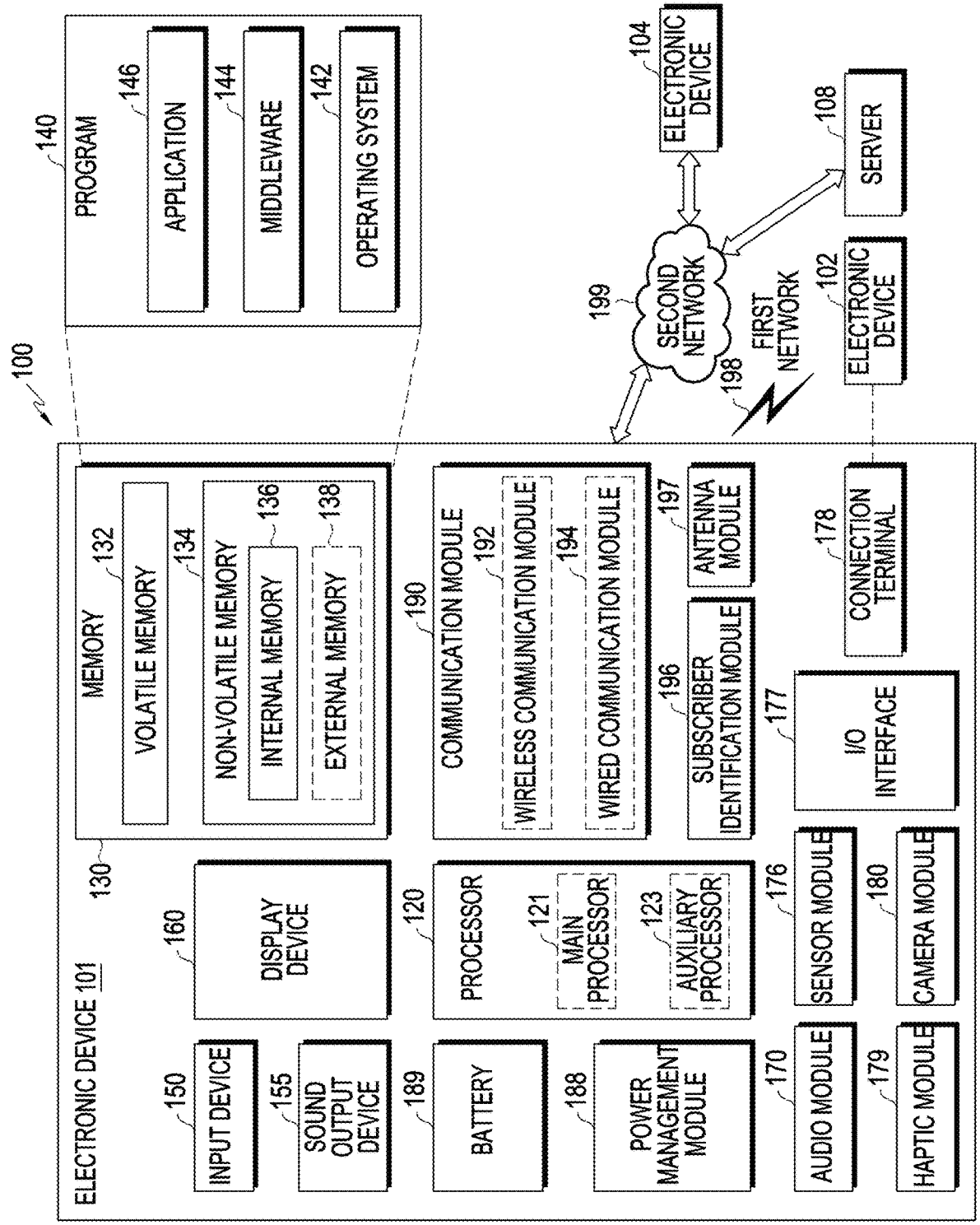
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
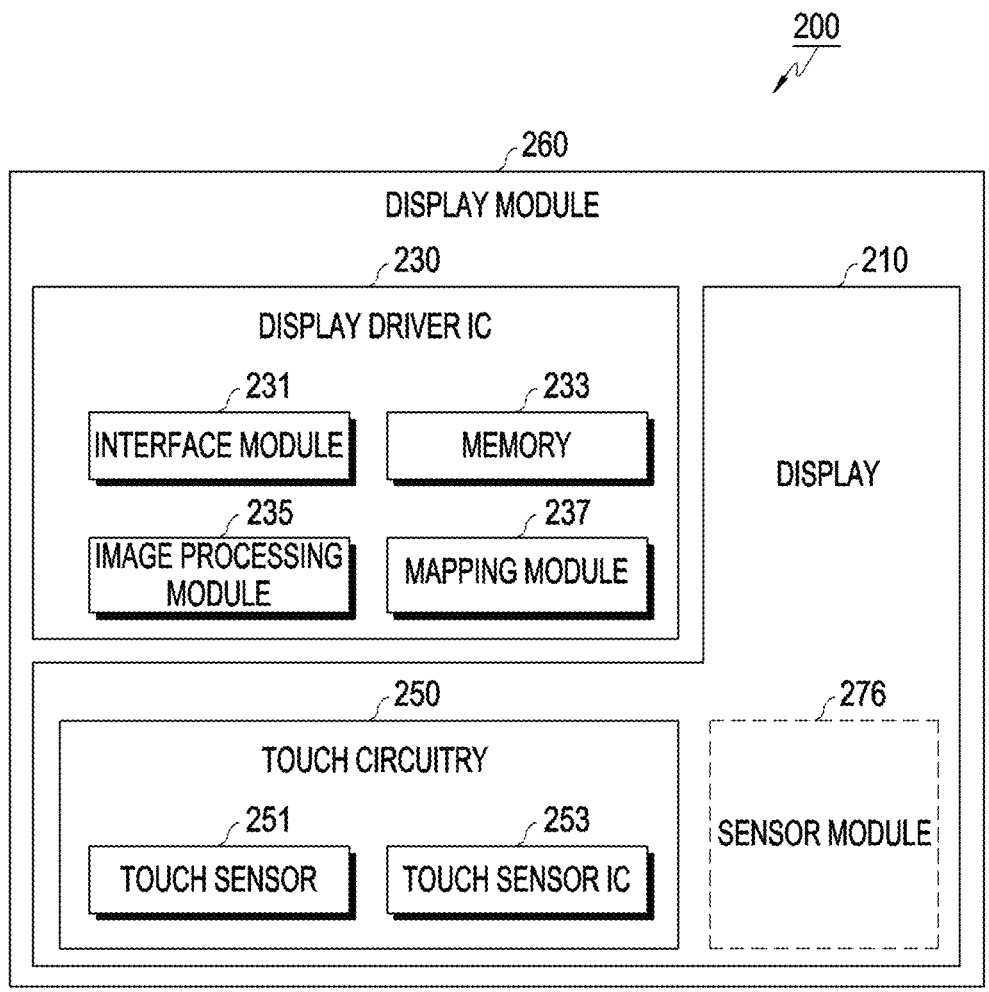
FIG. 2 is a block diagram illustrating a display module according to various embodiments.

FIG. 2 is a block diagram 200 illustrating the display device 260 according to various embodiments. Referring to FIG. 2, the display module 160 (e.g., the display module 160 of FIG. 1) may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device (e.g., the electronic device 101 of FIG. 1) via the interface module 231. For example, according to an embodiment, the image information may be received from the processor (e.g., the main processor 121 of FIG. 1 (e.g., an application processor)) or the auxiliary processor 123 (e.g., a graphics processing unit) operated independently from the function of the main processor 121 of FIG. 1. The DDI 230 may communicate, for example, with touch circuitry 250 or the sensor module 276 via the interface module 231. The DDI 230 may also store at least part of the received image information in the memory 233, for example, on a frame by frame basis. The image processing module 235 may perform pre-processing or post-processing (e.g., adjustment of resolution, brightness, or size), for example, based at least in part on one or more characteristics of the image data or one or more characteristics of the display 210 with respect to at least part of the image data. The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel) of the display 210. At least some pixels of the display 210 may be driven, for example, based at least in part on the voltage value or the current value such that visual information (e.g., a text, an image, or an icon) corresponding to the image data may be displayed via the display 210.

According to an embodiment, the display device 260 may further include the touch circuitry 250. The touch circuitry 250 may include a touch sensor 251 and a touch sensor integrated circuit (IC) 253 to control the touch sensor 251. The touch sensor IC 253 may control the touch sensor 251 to sense a touch input or a hovering input with respect to a certain position on the display 210. For example, the touch sensor IC 253 may measure a change in a signal (e.g., a voltage, a quantity of light, a resistance, or a quantity of one or more electric charges) corresponding to the certain position on the display 210 to sense a touch input or a hovering input. The touch sensor IC 253 may provide input information (e.g., a position, an area, a pressure, or a time) indicative of the detected touch input or the hovering input to the processor (e.g., the processor 120 of FIG. 1). According to an embodiment, at least part (e.g., the touch sensor IC 253) of the touch circuitry 250 may be formed as part of the display 210 or the DDI 230, or as part of another component (e.g., the auxiliary processor 223) disposed outside the display device 260.

According to an embodiment, the display device 260 may further include at least one sensor (e.g., a fingerprint sensor, an iris sensor, a pressure sensor, or an illuminance sensor) of the sensor module 276 or a control circuit for the at least one sensor. In such a case, the at least one sensor or the control circuit for the at least one sensor may be embedded in one portion of a component (e.g., the display 210, the DDI 230, or the touch circuitry 250)) of the display device 260. For example, when the sensor module 276 embedded in the display device 260 includes a biometric sensor (e.g., a fingerprint sensor), the biometric sensor may obtain biometric information (e.g., a fingerprint image) corresponding to a touch input received via a portion of the display 210. As another example, when the sensor module 276 embedded in the display device 260 includes a pressure sensor, the pressure sensor may obtain pressure information corresponding to a touch input received via a partial or whole area of the display 210. According to an embodiment, the touch sensor 251 or the sensor module 276 may be disposed between pixels in a pixel layer of the display 210, or over or under the pixel layer.

Figure 3:
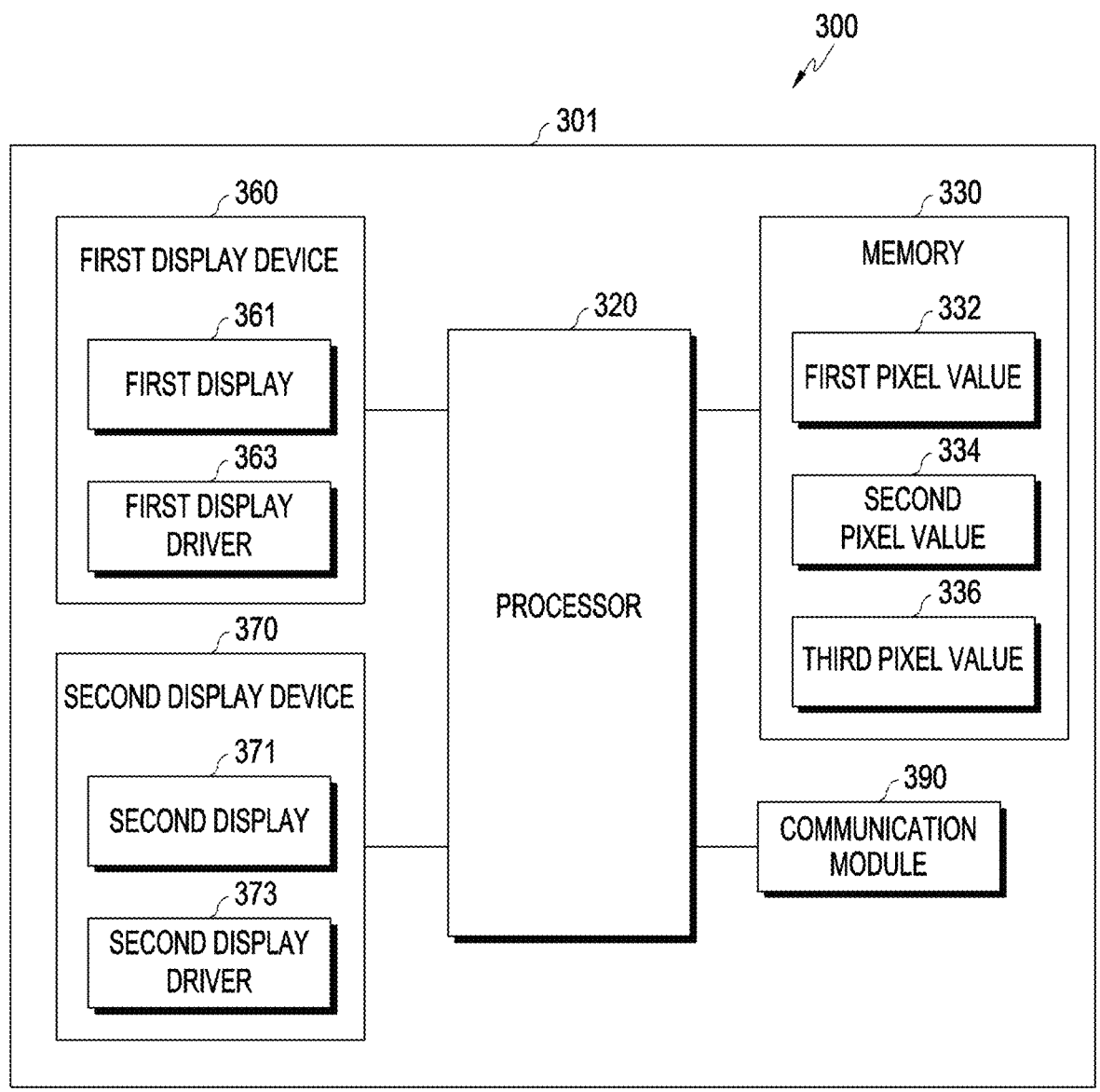
FIG. 3 is a block diagram illustrating an electronic device according to various embodiments.

FIG. 3 is a block diagram 300 illustrating an electronic device according to various embodiments.

Referring to FIG. 3, an electronic device 301 (e.g., the electronic device 101 of FIG. 1) may include a processor 320, a first display device 360, a second display device 370, a memory 330, and/or a communication module 390.

According to various embodiments, the processor 320 may control operation of the electronic device 301, may be the same as the processor 120 of FIG. 1, and may implement at least one function or operation performed by the processor 120.

According to various embodiments, if the processor 320 detects screen switching while primarily displaying first image data on a first display 361 using a first pixel value, the processor 320 may produce a third pixel value corresponding to the first pixel value 332 for display on the first display 361 by applying a first calibration value to a second pixel value for display on a second display 371, and may control a second display driver 373 so as to display the first image data on the second display 371 using the third pixel value.

According to an embodiment, the pixel value indicates the color value of each of sub-pixels (R.G.B.). For example, if a color value is in the range of 0 to 256, the pixel value may include the color values of sub-pixels, each of which has one color value in the range of 0 to 256. For example, if pixels included in a display are not damaged, the pixel value may include "(256, 256, 256)", and depending on the damage of each of the sub-pixels (R. G. B.) of the pixel, a corresponding color value may be lowered.

According to an embodiment, if a user selects displaying of the first image data on the first display 361, the processor 320 may transmit the first image data to a first display driver 363. If the first display driver 363 receives the first image data, the first display driver 363 may display the first image data on the first display 361 using the first pixel value 332 for display on the first display 361 which is stored in a memory 330 (e.g., the memory 233 of FIG. 2).

According to an embodiment, the first pixel value 332 for display on the first display 361 may be a value calibrated by applying a second calibration value to a pixel value capable of displaying image data on the first display 361 according to the damage of the pixels of the first display 361.

According to an embodiment, the first pixel value 332 for display on the first display 361 may be received from the processor 320 at regular intervals (e.g., 5 seconds, 30 seconds, 1 minutes, and the like) and may be stored. The processor 320 may collect image data displayed on the first display 361 in units of pixels at regular intervals, may identify whether the image data collected in units of pixels is damaged, and if the damage of the image data collected in units of pixels is greater than or equal to a predetermined level, may transmit, to the first display driver 363, the first pixel value obtained via calibration by applying the second calibration value to a pixel value associated with the damage of the pixels of the first display 361 using a calibrating algorithm for a display device.

According to an embodiment, the second pixel value for display on the second display 371 may be a value calibrated by applying the second calibration value to a pixel value capable of displaying image data on the second display 371 according to the damage of pixels of the second display 371.

According to an embodiment, the second pixel value 334 for display on the second display 371 may be received from the processor 320 at regular intervals (e.g., 5 seconds, 30 seconds, 1 minutes, and the like) and may be stored. The processor 320 may collect image data displayed on the second display 371 in units of pixels at regular intervals, may identify whether the image data collected in units of pixels is damaged, and if the damage of the collected image data in units of pixels is greater than a predetermined level, may transmit, to the second display driver 373, the second pixel value obtained via calibration by applying the second calibration value to a pixel value associated with the damage of the pixels of the second display 371 using a calibrating algorithm for a display device.

According to an embodiment, if the processor 320 detects screen switching while displaying the first image data on the first display 361 using the first pixel value, the processor 320 may transmit an event reporting screen switching to the first display driver 363 and the second display driver 373, may receive the first pixel value 332 for display on the first display 361 from the first display driver 363, and may receive the second pixel value for display on the second display 371 from the second display driver 373.

According to an embodiment, if the processor 320 detects screen switching while displaying the first image data on the first display 361 using the first pixel value, the processor 320 may detect the first pixel value 332 for display on the first display 361 and the second pixel value 334 for display on the second display 371, which are stored in the memory 330.

According to an embodiment, the processor 320 may obtain the difference between the first pixel value 332 for display on the first display 361 and the second pixel value for display on the second display 371. For example, the processor 320 may obtain the difference between the first pixel value 332 for display on the first display 361 and the second pixel value for display on the second display 371, by performing comparison in units of pixels. For example, the processor 320 may obtain the difference between the first pixel value 332 for display on the first display 361 and the second pixel value for display on the second display 371, by performing comparison based on a unit based on performance of a display driver, the unit being wider than a pixel unit. The processor 320 may detect first color data (e.g., a sub-pixel) having the lowest color value in first data indicating the difference value. The processor 320 may produce the first calibration value based on the first data and the color value of the first color data, and the processor 320 may apply the first calibration value to the second pixel value for display on the second display 371 so as to produce a third pixel value corresponding to the first pixel value 332 for display on the first display 361. The processor 320 may transmit the third pixel value and the first image data to the second display driver 373 so as to display the first image data on the second display 371 using the third pixel value. The second display driver 373 may display the first image data on the second display 371 using the third pixel value received from the processor 320.

According to an embodiment, the third pixel value may be a pixel value that is capable of performing strong calibration on pixels having a high level of damage if the pixels of the second display 371 get a high level of damage, and the third pixel value may be a pixel value that is capable of performing slight calibration on pixels having a low level of damage if the pixels of the second display 371 get a low level of damage.

According to an embodiment, the third pixel value may be a value which is obtained by calibrating the second pixel value for display on the second display 371, and is expressed in relative coordinates, instead of physical coordinates.

For example, if it is assumed that the original pixel value (an R value, a G value, and a B value) of the first image data is "100%/100%/100%(256/256/256)", a pixel value for the first display 361 based on the damage of a pixel is "100%/100%/80%(256/256/200)", and a pixel value for the second display 371 based on the damage of a pixel is "95%/95%/40%(243/243/100)", an operation of displaying the first image data on the second display 371 using the sense of color similar to when the first image data was displayed on the first display 361, in the case in which the first image data displayed on the first display 361 is switched to be displayed on the second display 371 as screen switching is performed, will be described as below.

If the processor 320 identifies that the user selects to display the first image data on the first display 361, the processor 320 may transmit the first image data to the first display driver 363.

If the first display driver 363 receives the first image data from the processor 320, the first display driver 363 may detect a first pixel value stored in the memory of the first display device 360, and the first display driver 363 may display the first image data on the first display 361 using the first pixel value.

The first pixel value may be a pixel value calibrated by applying a second calibration value to a pixel value for the first display 361 received from the processor 320. The processor 320 may produce the first pixel value using a filter calibration value of "70%" as the second calibration value. The filter calibration value, which is the second calibration value, may be set in advance in the electronic device 301, or the filter calibration value may be set differently based on the damage of pixels of a display.

Only B sub-pixel is damaged by 20% in "100%/100%/80% (256/256/200)" which is the pixel value of the first display 361. Thus, the processor 320 may perform 70% filter calibration on the 20% damage, may produce "100%/100%/94% (256/256/240)" which is the first pixel value 332 for display on the first display 361, and may transmit the same to the first display driver 363.

⟨First pixel value⟩

R: 100%(256)

G:100%(256)

B: 80(200) + 14(70% filter calibration on 20% damage) = 94%(240)

If the processor 320 detects screen switching while displaying the first image data on the first display 361 using the first pixel value, the processor 320 may transmit an event reporting the screen switching to the first display driver 363 and the second display driver 373, may receive the first pixel value 332 for display on the first display 361 from the first display driver 363, and may receive a second pixel value for display on the second display 371 from the second display driver 373.

The second pixel value may be a pixel value calibrated by applying the second calibration value to a pixel value for the second display 371 received from the processor 320. The processor 320 may produce the second pixel value using a filter calibration value of "70%" as the second calibration value.

An R sub-pixel is damaged by 5%, a G sub-pixel is damaged by 5%, and a B sub-pixel is damaged by 60% in "95%/95%/40%(243/243/100)" which is the pixel value of the second display 371, and thus, the processor 320 may perform 70% filter calibration on the damage of each sub-pixel, may produce "98.5%/98.5%/82%(252/252/210)" which is the second pixel value for display on the second display 371, and may transmit the same to the second display driver 373.

⟨Second pixel value⟩

R: 95 + 3.5(70% filter calibration on 5% damage) = 98.5%(252)

G: 95 + 3.5(70% filter calibration on 5% damage) = 98.5%(252)

B: 40 + 42(70% filter calibration on 60% damage) = 82%(210)

If the second display driver 373 displays the first image data on the second display 371 using "98.5%/98.5%/82% (252/252/210)" which is the second pixel value, a user may recognize the color of the first image data as a pixel value of "256/256/213" having a brightness of 98.5% according to a color proportion.

When comparing "100%/100%/94%(256/256/240)" which is the first pixel value 332 for display on the first display 361, and "256/256/213" which is the pixel value that the use may recognize from the second pixel value, the color value 213 of B is low. Accordingly, if the first image data displayed on the first display 361 using "100%/100%/94% (256/256/240)" which is the first pixel value 332 for display on the first display 361 is switched to be displayed on the second display 371 using "256/256/213" which is the pixel value that the user is capable of recognizing from the second pixel value, the first image data may be displayed in a different sense of color.

The processor 320 may obtain "98.5%/98.5%/87%" which is first data indicating the difference value between "100%/100%/94%(256/256/240)" which is the first pixel value 332 for display on the first display 361 and "98.5%/98.5%/82%(252/252/210)" which is the second pixel value for display on the second display 371.

⟨First data⟩

R: 98.5%/100% = 98.5%

G: 98.5%/100% = 98.5%

B: 82%/94% = 87%

The processor 320 may identify "87%" which is the color value of a B sub-pixel, that is, first color data which is the lowest color value among the color values included in the first data, and may obtain, as a first calibration value, a filter calibration value of "88.3%/88.3%/100%" which enables "98.5%/98.5%/87%" which is the first data to be "87%" which is the color value of the B sub-pixel, that is, the first color data, ⟨First calibration value⟩

R: 98.5% ∗ (filter R value : 88.3%) = 87%

G: 98.5% ∗ (filter G value : 88.3%) = 87%

B: 87% ∗ (filter B value:100%) = 87%

If the strength of calibration on the color sense is set to 100%, the processor 320 may produce a third pixel value of "222/222/210" by applying the first calibration value of "88.3%/88.3%/100%" to "98.5%/98.5%/82%(252/252/210)" which is the second pixel value for display on the second display 371.

⟨Third pixel value when strength of calibration on color sense is set to 100%⟩

R: 222 (R value of second pixel value of second display: 252*filter R value: 88.3%)

G: 222 (G value of second pixel value of second display: 252*filter G value: 88.3%)

B: 210 (B value of second pixel value of second display: 210*filter B value: 100%)

If the second display 371 displays the first image data using the third pixel value of "222/222/210", the user may recognize the color of the first image data as a pixel value of "256/256/241" according to application of a color proportion.

When comparing "98.5%/98.5%/82%(252/252/210)" which is the second pixel value for display on the second display 371 and "222/222/210" which is the third pixel value produced for agreement of color sense, a change of "−11%/−11%/0%" is made and a brightness is slightly decreased. However, the first image data may be displayed on the second display 371 in a color similar to the color of the first display 361.

If the strength of calibration on the color sense is set to 50%, the processor 320 may set the first calibration value to "94.2%/94.2%/100%" which is obtained by changing the R value and the G value in the first calibration value of "88.3%/88.3%/100%" to predetermined values set for the 50% calibration strength, and may produce a third pixel value of "237/237/210" by applying the changed first calibration value of "94.2%/94.2%/100%" to "98.5%/98.5%/82%(252/252/210)" which is the second pixel value for display on the second display 371.

⟨Third Pixel Value when Strength of Calibration on Color Sense is Set to 50%⟩

R: 237 (R value of second pixel value of second display: 252*filter R value: 94.2%)

G: 237 (G value of second pixel value of second display: 252*filter G value: 94.2%)

B: 210 (B value of second pixel value of second display: 210*filter B value: 100%)

If the second display 371 displays the first image data using the third pixel value of "237/237/210", the user may recognize the color of the first image data as a pixel value of "256/256/226" according to application of a color proportion.

When comparing "98.5%/98.5%/82%(252/252/210)" which is the second pixel value for display on the second display 371 and "237/237/210" which is the third pixel value produced for agreement of color sense, a change of "−5.8%/−5.8%/0%" is made and the first image data may be displayed on the second display 371 in a color of which the brightness is increased.

According to an embodiment, the strength of calibration on the color sense may be set in advance in the electronic device 301.

According to an embodiment, in the case of the strength of calibration on the color sense, the value of strength of calibration on color sense to be applied may be flexibly set according to the damage of pixels of a display.

According to an embodiment, the first calibration value may be changed according to the strength of calibration on color sense, and the first calibration value, which differs depending on the strength of the calibration on color sense, may be set in advance in the electronic device 301, or the first calibration value may be set based on the damage of pixels of a display.

As another example, if it is assumed that the original pixel value (an R value, a G value, and a B value) of the first image data is "100%/100%/100%(256/256/256)", a pixel value for the first display 361 based on the damage of a pixel is "95%/95%/40%(243/243/100)", and a pixel value for the second display 371 based on the damage of a pixel is "100%/90%/80%(256/230/200)", an operation of displaying the first image data on the second display 371 using the sense of color similar to when the first image data was displayed on the first display 361, in the case in which the first image data displayed on the first display 361 is switched to be displayed on the second display 371 as screen switching is performed, will be described as follow.

If the processor 320 identifies that the user selects to display the first image data on the first display 361, the processor 320 may transmit the first image data to the first display driver 363.

If the first display driver 363 receives the first image data from the processor 320, the first display driver 363 may detect a first pixel value stored in the memory of the first display device 360, and the first display driver 363 may display the first image data on the first display 361 using the first pixel value.

The first pixel value may be a pixel value calibrated by applying a second calibration value to a pixel value for the first display 361 received from the processor 320. The processor 320 may produce the first pixel value using a filter calibration value of "50%" as the second calibration value. The filter calibration value, which is the second calibration value, may be set in advance in the electronic device 301, or filter calibration value may be set differently based on the damage of pixels of a display.

An R sub-pixel is damaged by 5%, a G sub-pixel is damaged by 5%, and a B sub-pixel is damaged by 60% in "95%/95%/40%(243/243/100)" which is the pixel value of the first display 361, and thus, the processor 320 may perform 50% filter calibration on the damage of each sub-pixel, may produce "97.5%/97.5%/70%(250/250/179)" which is the first pixel value 332 for display on the first display 361, and may transmit the same to the first display driver 363.

⟨First pixel value⟩

R: 95 + 2.5(50% filter calibration on 5% damage) = 97.5%(250)

G: 95 + 2.5(50% filter calibration on 5% damage) = 97.5%(250)

B: 40 + 30(50% filter calibration on 60% damage) = 70%(179)

If the first display driver 363 displays the first image data on the first display 361 using "97.5%/97.5%/70%(250/250/179)" which is the first pixel value, the user may recognize the color of the first image data as a pixel value of "256/256/183" according to a color proportion.

If the processor 320 detects screen switching while displaying the first image data on the first display 361 using the first pixel value, the processor 320 may transmit an event reporting the screen switching to the first display driver 363 and the second display driver 373, may receive the first pixel value 332 for display on the first display 361 from the first display driver 363, and may receive a second pixel value for display on the second display 371 from the second display driver 373.

The second pixel value may be a pixel value calibrated by applying the second calibration value to a pixel value for the second display 371 received from the processor 320. The processor 320 may produce the second pixel value using a filter calibration value of "50%" as the second calibration value.

A G sub-pixel is damaged by 10% and a B sub-pixel is damaged by 20% in "100%/90%/80%(256/230/200)" which is the pixel value of the second display 371, and thus, the processor 320 may perform 50% filter calibration on the damage of each sub-pixel, may produce "100%/95%/90% (256/243/230)" which is the second pixel value for display on the second display, and may transmit the same to the second display driver 373.

⟨Second pixel value⟩

R:100%

G: 90 + 5(50% filter calibration on 10% damage) = 95%(243)

B: 80 + 10(50% filter calibration on 20% damage) = 90%(230)

The processor 320 may obtain "103%/97%/129%" which is first data indicating the difference value between "97.5%/97.5%/70%(250/250/179)" which is the first pixel value 332 for display on the first display 361 and "100%/95%/90% (256/243/230)" which is the second pixel value for display on the second display 371.

⟨First data⟩

R: 100%/97.5% = 103%

G: 95%/97.5% = 97%

B: 90%/97.5% = 129%

The processor 320 may identify "97%" which is the color value of the G sub-pixel, that is, first color data which is the lowest color value among color values included in the first data, and may obtain, as a first calibration value, a filter calibration value of "94.2%/100%/75.2%" which enables "103%/97%/129%" which is the first data to be "97%" which is the color value of the G sub-pixel, that is, the first color data, ⟨First calibration value⟩

R: 103 ∗ (filter R value) = 97%

G: 97 ∗ (filter G value) = 97%

B: 129 ∗ (filter B value) = 97%

If the value of strength of calibration on the color sense is set to 100%, the processor 320 may produce a third pixel value of "241/243/173" by applying the first calibration value of "94.2%/100%/75.2%" to "100%/95%/90%(256/243/230)" which is the second pixel value for display on the second display 371.

<Third Pixel Value when Strength of Calibration on Color Sense is Set to 100%>
R: 241 (R value of second pixel value of second display: 256*filter R value: 94.2%)
G: 243 (G value of second pixel value of second display: 243*filter G value: 100%)
B: 173 B value of second pixel value of second display: 230*filter B value: 75.2%)

If the second display 371 displays the first image data using the third pixel value of "241/243/173", the user may recognize the color of the first image data as a pixel value of "254/256/182" according to application of a color proportion.

When comparing "100%/95%/90%(256/243/230)" which is the second pixel value for display on the second display 371 and "241/243/173" which is the third pixel value produced for agreement of color sense, a change of "−5.8%/−0%/−24.8%" is made and a brightness is slightly decreased. However, the first image data may be displayed on the second display 371 in a color similar to the color of the first display 361.

If the value of the strength of calibration on the color sense is set to 70%, the processor 320 may set the first calibration value to "96%/100%/82.7%" which is obtained by changing the R value and the B value in the first calibration value of "94.2%/100%/75.2%" to predetermined values set for the 70% calibration strength value, and may produce a third pixel value of "246/243/190" by applying the changed first calibration value of "96%/100%/82.7%" to "100%/95%/90%(256/243/230)" which is the second pixel value for display on the second display 371.

<Third Pixel Value when Strength of Calibration on Color Sense is Set to 70%>
R: 246 (R value of second pixel value of second display: 256*filter R value: 96%)
G: 243 (G value of second pixel value of second display: 243*filter G value: 100%)
B: 190 (B value of second pixel value of second display: 230*filter B value: 82.7%)

If the second display 371 displays the first image data using the third pixel value of "246/243/190", the user may recognize the color of the first image data as a pixel value of "256/253/197" according to application of a color proportion.

When comparing "100%/95%/90%(256/243/230)" which is the second pixel value for display on the second display 371 and "246/243/190" which is the third pixel value produced for agreement of color sense, a change of "−4.0%/

0%/−17.3" is made and the first image data may be displayed on the second display 371 in a color of which the brightness is increased.

According to an embodiment, if the processor 320 detects screen switching while displaying the first image data on the second display 371 using the third pixel value, the processor 320 may transmit the first image data to the first display driver 363 so as to display the first image data on the first display 361 using the first pixel value. The first display driver 363 may display the first image data received from the processor 320 on the first display 361 using the first pixel value.

According to an embodiment, if the processor 320 detects screen switching while primarily displaying the first image data on the second display 371 using a second pixel value, the processor 320 may produce a third pixel value corresponding to the second pixel value for display on the second display 371 by applying a first calibration value to a first pixel value 332 for display on the first display 361, and may control the first display driver 363 so as to display the first image data on the first display 361 using the third pixel value. The processor 320 may perform an operation of displaying the first image data displayed on the second display 371 using the second pixel value, on the first display 361 using the third pixel value as the screen switching is performed, in the same manner as the operation of displaying the first image data displayed on the first display 361 using the first pixel value, on the second display 371 using the third pixel value.

According to various embodiments, if the processor 320 detects screen switching while primarily displaying the first image data on the first display 361 using a first pixel value, the processor 320 may transmit an event reporting the screen switching to the first display driver 363 and the second display driver 373. The processor 320 may control the second display driver 373 so as to produce a third pixel value corresponding to the first pixel value 332 for display on the first display 361 in the second display driver 373, and the processor 320 may perform control so as to display the first image data on the second display 371 using the third pixel value.

According to an embodiment, the second display driver 373 may receive the event reporting the screen switching from the processor 320, and the second display driver 373 may receive the first pixel value 332 for display on the first display 361 from the first display driver 363. If the first display driver 363 receives the event reporting the screen switching from the processor 320, the first display driver 363 may transmit the first pixel value 332 for display on the first display 361 to the second display driver 373.

According to an embodiment, if the first display device 360 and the second display device 370 are connected via wired communication (e.g., I2C or SPI) or wireless communication, the first display driver 363 may transmit the first pixel value 332 for display on the first display 361 to the second display driver 373 via wired communication or wireless communication.

According to an embodiment, if the first display device 360 and the second display device 370 are not connected via wired communication or wireless communication, the first display driver 363 may transmit the first pixel value 332 for display on the first display 361 to the second display driver 373 via the processor 320.

According to an embodiment, the second display driver 373 may obtain the difference between the first pixel value 332 for display on the first display 361, which is received from the first display driver 363, and the second pixel value for display on the second display 371, which is stored in the memory (e.g., the memory 233 of FIG. 2) of the second display device 370, and may obtain first color data (e.g., a sub-pixel) having the lowest color value in first data indicating the difference value. The second display driver 373 may produce the first calibration value based on the first data and the color value of the first color data, and the second display driver 373 may apply the first calibration value to the second pixel value for display on the second display 371 so as to produce a third pixel value corresponding to the first pixel value 332 for display on the first display 361. The second display driver 373 may display the first image data on the second display 371 using the third pixel value.

According to an embodiment, if the processor 320 detects screen switching while primarily displaying the first image data on the second display 371 using a second pixel value, the processor 320 may control the first display driver 363 so as to produce a third pixel value corresponding to the second pixel value for display on the second display 371 in the first display driver 363, and may perform control so as to display the first image data on the first display 361 using the third pixel value. In the same manner as the second display driver 373, the first display driver 363 may produce the third pixel value corresponding to the second pixel value for display on the second display 371, and the first display driver 363 may perform control so as to display the first image data on the first display 361 using the third pixel value.

According to various embodiments, if the processor 320 detects screen switching while displaying the first image data on the first display 361 using a first pixel value, the processor 320 may determine, based on the type of the first image data, whether to display the first image data on the second display 371 using a third pixel value corresponding to the first pixel value 332 for display on the first display 361 or to display the first image data using a second pixel value for display on the second display 371.

According to an embodiment, if the processor 320 identifies that the type of the first image data corresponds to image data or image data of an application capable of being displayed using the third pixel value, the processor 320 may display the first image data on the second display 371 using the third pixel value corresponding to the first pixel value 332 for display on the first display 361. For example, if the first image data is identified as image data (e.g., gallery application, photo data, or video data) or image data of an application, which does not have a big change in the color sense, the processor may display the first image data on the second display 371 using the third pixel value corresponding to the first pixel value 332 for display on the first display 361.

According to an embodiment, if the type of the first image data is identified as not image data or image data of an application that is capable of being displayed using the third pixel value, the processor 320 may not transmit an event for reporting the screen switching to the first display driver 363 and the second display driver 373, and thus, the second display driver 373 may display the first image data on the second display 371 using the second pixel value for display on the second display 371.

According to various embodiments, the first display device 360 and the second display device 370 may be implemented to be substantially the same as, or similar to, the display module 160 of FIG. 1 and the display module 160 of FIG. 2, respectively.

According to an embodiment, the first display device 363 may include the first display 361 (e.g., the display 210 of FIG. 2), the first display driver 363 (e.g., the display driver IC 230 of FIG. 2), and a memory (e.g., the memory 233 of FIG. 2).

The first display driver 363 may store a first pixel value, which is received periodically from the processor 320, in the memory as a first pixel value for display on the first display, and the first display driver 363 may display first image data received from the processor 320 on the first display 361 using the first pixel value.

If the first display driver receives an event reporting screen switching from the processor 320, while displaying the first image data on the first display 361, the first display driver 363 may transmit the first pixel value for display on the first display to the processor 320 or to the second display driver 373.

If the first display driver 363 receives an event reporting screen switching from the processor 320 while displaying the first image data on the second display 371, and if the first display driver 363 receives the first image data and a third pixel value corresponding to a second pixel value for display on the second display from the processor 320, the first display driver 363 may store the third pixel value 336 in the memory, and the first display driver 363 may display the first image data on the first display 361 using the third pixel value.

If the first display driver 363 receives an event reporting screen switching from the processor 320 while displaying the first image data on the second display 371, and receives a second pixel value for display on the second display 371 from the second display driver 373, the first display driver 363 may produce a third pixel value corresponding to the second pixel value for display on the second display based on the difference between the first pixel value 332 for display on the first display 361 and the second pixel value for display on the second display 371, and may store the third pixel value 336 in the memory. If the first display driver 363 receives the first image data from the processor 320, the first display driver 363 may display the first image data on the first display 361 using the third pixel value.

According to an embodiment, the second display device 370 may include the second display 371 (e.g., the display 210 of FIG. 2), the second display driver 373 (e.g., the display driver IC 230 of FIG. 2), and a memory (e.g., the memory 233 of FIG. 2).

The second display driver 373 may store a second pixel value 334 received periodically from the processor 320 in the memory as a second pixel value for display on the second display, and the second display driver 373 may display first image data received from the processor 320 on the second display 371 using the second pixel value.

If the second display driver 373 receives an event reporting screen switching from the processor 320, while displaying the first image data on the second display 371, the second display driver 373 may transmit the second pixel value for display on the second display to the processor 320 or to the first display driver 363.

If the second display driver 373 receives an event reporting screen switching from the processor 320 while displaying the first image data on the first display 361, and if the second display driver 373 receives the first image data and a third pixel value corresponding to a first pixel value for display on the first display from the processor 320, the second display driver 373 may store the third pixel value 336 in the memory and may display the first image data on the second display 371 using the third pixel value.

If the second display driver 373 receives an event reporting screen switching from the processor 320 while displaying the first image data on the first display 361, and if the second display driver 373 receives a first pixel value 332 for display on the first display 361 from the first display driver 363, the second display driver 373 may produce a third pixel value corresponding to the first pixel value for display on the first display based on the difference between the first pixel value 332 for display on the first display 361 and the second pixel value for display on the second display 371, and the second display driver 373 may store the third pixel value in the memory. If the second display driver 373 receives the first image data received from the processor 320, the second display driver 373 may display the first image data on the second display 371 using the third pixel value.

According to an embodiment, the third pixel value which corresponds to the second pixel value for display on the second display and is stored in the memory of the first display device 360 may be different value from the third pixel value which corresponds to the first pixel value for display on the first display and is stored in the memory of the second display device 370.

According to various embodiments, the memory 330 may be implemented to be substantially the same as, or similar to, the memory 130 of FIG. 1.

According to an embodiment, the memory 330 may store a first pixel value for display on the first display, a second pixel value for display on the second display, a third pixel value corresponding to the first pixel value for display on the first display, and/or a third pixel value corresponding to the second pixel value for display on the second display.

According to various embodiments, the communication module 390 may be implemented to be substantially the same as, or similar to, the communication module 190 of FIG. 1, and may include a plurality of communication circuits that use different communication technologies.

According to an embodiment, the communication module 390 may include at least one of a wireless LAN module (not illustrated) and a near-field communication module (not illustrated), and the near-field communication module (not illustrated) may include an ultra-wide band (UWB) communication module, a Wi-Fi™ communication module, a near-field communication (NFC) communication module, a Bluetooth™ legacy communication module, and/or a BLE (bluetooth low energy) communication module.

Figure 4A:
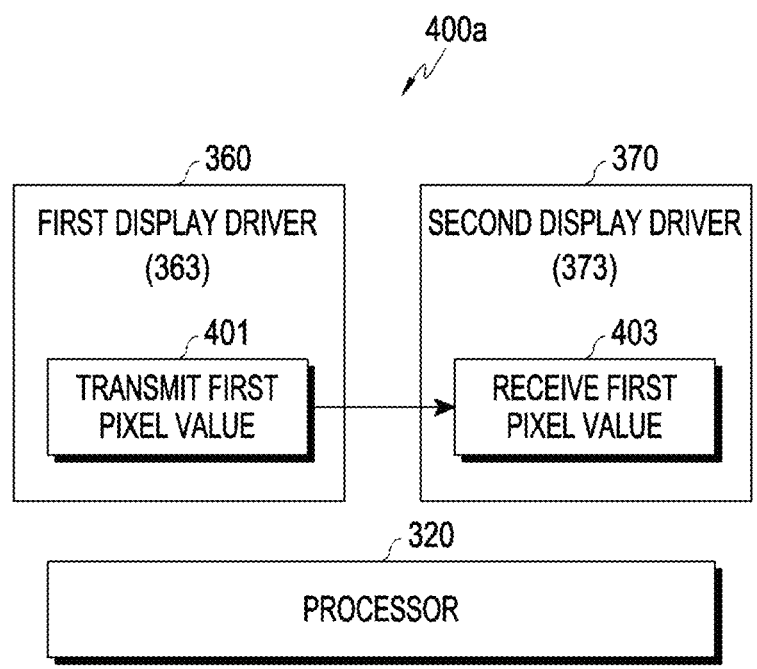
FIGS. 4A and 4B are diagrams illustrating an operation of transmitting a first pixel value for display on a first display to a second display by an electronic device according to various embodiments.
Figure 4B:
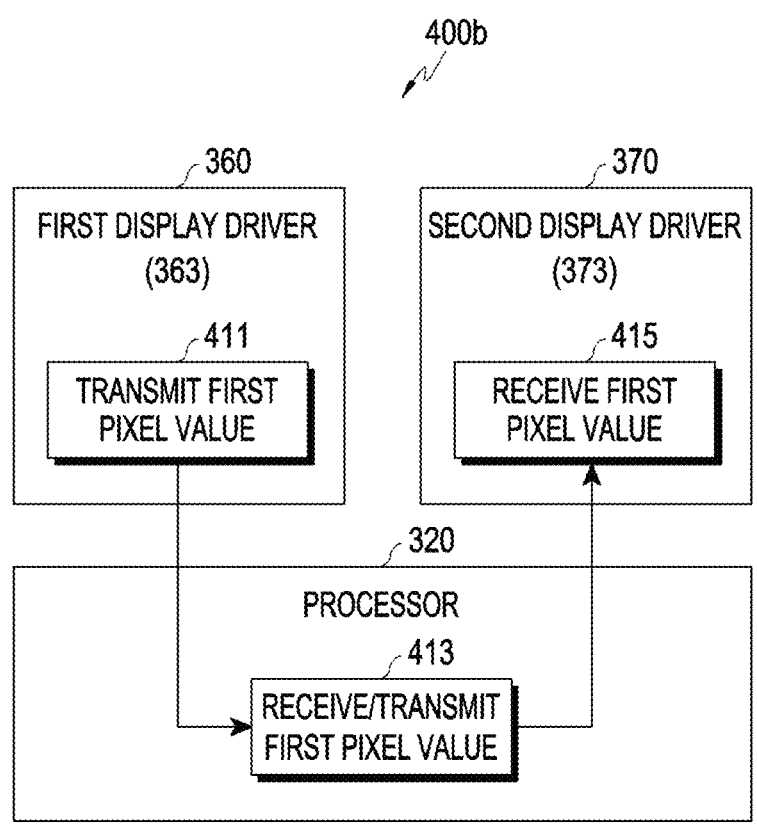

FIGS. 4A and 4B are diagrams 400a and 400b illustrating an operation of transmitting a first pixel value for display on a first display to a second display by an electronic device according to various embodiments. FIGS. 4A and 4B are diagrams illustrating an operation of transmitting a first pixel value for display on a first display to a second display when a display driver produces a third pixel value for agreement of color sense.

Referring to FIG. 4A, in order to display first image data on a second display since screen switching is performed while the first image data is displayed on a first display using a first pixel value, the first display driver 363 may transmit the first pixel value for display on the first display to the second display driver 373 based on wired communication or wireless communication connected between the first display device 360 and the second display device 370, in operation 401. If the second display driver 373 receives the first pixel value for display on the first display from the first display driver 363 in operation 403, the second display driver 373 may produce a third pixel value corresponding to the first pixel value based on the difference between the first pixel value for display on the first display and a second pixel value for display on the second display, which is stored in the memory of the second display device 370. The second display driver 373 may display the first image data on the second display 371 using the third pixel value.

Referring to FIG. 4B, in order to display first image data on a second display since screen switching is performed while the first image data is displayed on a first display using a first pixel value, the first display driver 363 may transmit the first pixel value for display on the first display to the processor 320 in operation 411 if the first display device 360 and the second display device 370 are not connected via wired communication or wireless communication. The processor 320 may transmit the first pixel value received from the first display driver 363 to the second display driver 373 in operation 413. If the second display driver 373 receives the first pixel value for display on the first display from the processor 320 in operation 415, the second display driver 373 may produce a third pixel value corresponding to the first pixel value based on the difference between the first pixel value for display on the first display and a second pixel value for display on the second display, which is stored in the memory of the second display device 370. The second display driver 373 may display the first image data on the second display 371 using the third pixel value.

According to various embodiments, the electronic device (e.g., the electronic device 301) may include the first display driver 363 configured to control the first display 361, the second display driver 373 configured to control the second display 371, and the processor 320. The processor may be configured to: detect screen switching while displaying first image data on the first display, wherein the displaying of the first image data on the first display includes using a first pixel value, in response to the detection, produce a first calibration value based on a difference between the first pixel value for display on the first display and a second pixel value for display on the second display, produce a third pixel value corresponding to the first pixel value by applying the first calibration value to the second pixel value, and control the second display driver so as to display the first image data on the second display using the third pixel value.

According to various embodiments, the second display driver may be configured to: in response to receiving, from the processor, an event reporting the screen switching, the first image data, and the third pixel value, display the first image data on the second display using the third pixel value.

According to various embodiments, the processor may be configured to: in response to detecting the screen switching, receive the first pixel value for display on the first display from the first display driver; and receive the second pixel value for display on the second display from the second display driver.

According to various embodiments, the first pixel value for display on the first display may be a value calibrated by applying a second calibration value to a pixel value capable of displaying image data on the first display according to a damage of pixels included in the first display; and the second pixel value for display on the second display may be a value calibrated by applying the second calibration value to a pixel value capable of displaying image data on the second display according to a damage of pixels included in the second display.

According to various embodiments, the processor may be configured to: produce first data including the difference value between the first pixel value for display on the first display and the second pixel value for display on the second display; detect first color data having the lowest color value in (e.g., among) color data included in the first data; and produce the first calibration value using the first data and the color value of the first color data.

According to various embodiments, the second display driver may be configured to: produce a first calibration value based on a difference between the first pixel value for display on the first display and the second pixel value for display on the second display, in response to receiving, from the processor, an event reporting the screen switching and the first image data, and from the first display driver, the first pixel value for display on the first display, produce a third pixel value corresponding to the first pixel value by applying the first calibration value to the second pixel value for display on the second display; and display the first image data on the second display using the third pixel value.

According to various embodiments, the first display driver may be configured to: in response to receiving, from the processor, the event reporting the screen switching, transmit the first pixel value for display on the first display to the second display driver.

According to various embodiments, the second display driver may be configured to: produce first data indicating the difference value between the first pixel value for display on the first display and the second pixel value for display on the second display; detect first color data having the lowest color value in color data included in the first data; and produce the first calibration value using the first data and the color value of the first color data.

According to various embodiments, the processor may be configured to: in response to detecting the screen switching, determine, based on a type of the first image data, whether to display the first image data using the third pixel value, and in response to identifying the first image data as a type of data or a type of application that is capable of being displayed using the third pixel value, display the first image data on the second display using the third pixel value.

According to various embodiments, the processor may be configured to: in response to identifying the first image data is identified as not a type of data or a type of application that is capable of being displayed using the third pixel value, display the first image data on the second display using the second pixel value for display on the second display.

Figure 5:
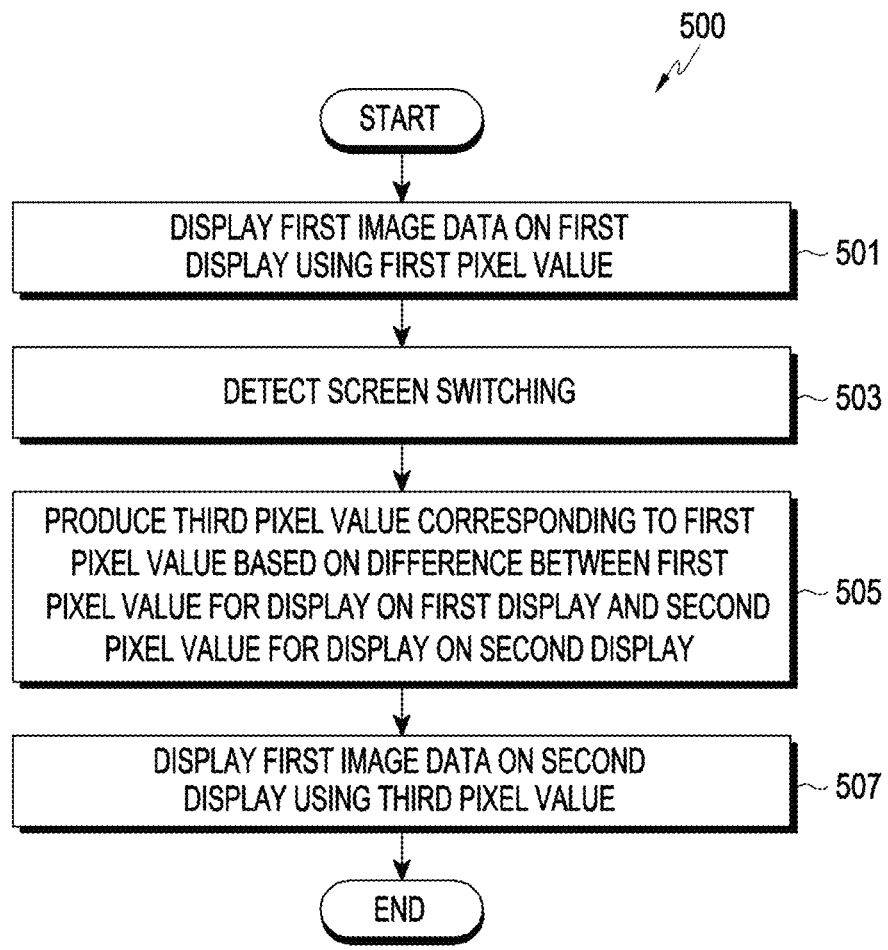
FIG. 5 is a flowchart illustrating an operation of calibrating pixel data by an electronic device according to various embodiments.

FIG. 5 is a flowchart 500 illustrating an operation of calibrating pixel data by an electronic device according to various embodiments. The operation of calibrating the pixel data may include operations 501 to 507, and it is construed that the calibration is performed by an electronic device (e.g., the electronic device 101 of FIG. 1 and the electronic device 301 of FIG. 3) or the processor of the electronic device 101 (e.g., the processor 120 of FIG. 1 or the processor 320 of the electronic device 301 of FIG. 3). According to an embodiment, at least one of operations 501 to 507 may be omitted, or some operations may be performed in a different order, or another operation may be further added.

In operation 501, the electronic device (e.g., the electronic device 101 of FIG. 1 and the electronic device 301 of FIG. 3) may output or display first image data on a first display (e.g., the first display 361 of FIG. 3) using a first pixel value.

According to an embodiment, if a user selects displaying of the first image data on the first display, the electronic device may transmit the first image data to a first display driver (e.g., the first display driver 363 of FIG. 3). If the first display driver receives the first image data, the first display driver may display the first image data on the first display using a first pixel value for display on the first display, which is stored in a memory (e.g., the memory 233 of FIG. 2) of a first display device.

According to an embodiment, the first pixel value for display on the first display may be a value calibrated by applying a second calibration value to a pixel value capable of displaying image data on the first display according to the damage of pixels of the first display.

According to an embodiment, the first pixel value for display on the first display may be received from the processor (e.g., the processor 320 of FIG. 3) at regular intervals and may be stored. The processor may collect image data displayed on the first display in units of pixels at regular intervals, may identify whether the image data collected in units of pixels is damaged, and if the damage of the image data collected in units of pixels is greater than or equal to a predetermined level, may transmit, to the first display driver, the first pixel value obtained via calibration by applying the second calibration value to a pixel value associated with the damage of the pixels of the first display using a calibrating algorithm for a display device.

In operation 503, the electronic device (e.g., the electronic device 101 of FIG. 1 and the electronic device 301 of FIG. 3) may detect screen switching.

According to an embodiment, the electronic device may detect screen switching for displaying the first image data on the second display 371, while displaying the first image data on the first display (e.g., the first display 361 of FIG. 3) using the first pixel value.

In operation 505, the electronic device (e.g., the electronic device 101 of FIG. 1 and the electronic device 301 of FIG. 3) may produce a third pixel value corresponding to the first pixel value based on the difference between the first pixel value for display on the first display and a second pixel value for display on the second display.

According to an embodiment, the second pixel value for display on the second display (e.g., the second display 371 of FIG. 3) may be a value calibrated by applying the second calibration value to a pixel value capable of displaying image data on the second display according to the damage of pixels of the second display.

According to an embodiment, the second pixel value for display on the second display may be received from the processor (e.g., the processor 320 of FIG. 3) at regular intervals and may be stored. The processor may collect image data displayed on the second display in units of pixels at regular intervals, may identify whether the image data collected in units of pixels is damaged, and if the damage of the image data collected in units of pixels is greater than or equal to a predetermined level, may transmit, to a second display driver (e.g., the second display driver 373 of FIG. 3), the second pixel value obtained via calibration by applying the second calibration value to a pixel value associated with the damage of the pixels of the second display using a calibrating algorithm for a display device.

According to an embodiment, the electronic device may obtain the difference between the first pixel value for display on the first display and the second pixel value for display on the second display, and may detect first color data (e.g., a sub-pixel) having the lowest color value in first data indicating the difference value. The electronic device may produce a first calibration value based on the first data and the color value of the first color data, and the electronic device may apply the first calibration value to the second pixel value for display on the second display so as to produce the third pixel value corresponding to the first pixel value for display on the first display.

According to an embodiment, the third pixel value may be a pixel value that is capable of performing strong calibration on pixels having a high level of damage if the pixels of the second display get a high level of damage, and the third pixel value may be a pixel value that is capable of performing slight calibration on pixels having a low level of damage if the pixels of the second display get a low level of damage.

According to an embodiment, the third pixel value may be a value obtained by calibrating the second pixel value for display on the second display, and is expressed in relative coordinates, instead of physical coordinates.

In operation 507, the electronic device (e.g., the electronic device 101 of FIG. 1 and the electronic device 301 of FIG. 3) may display the first image data on the second display using the third pixel value.

Figure 6:
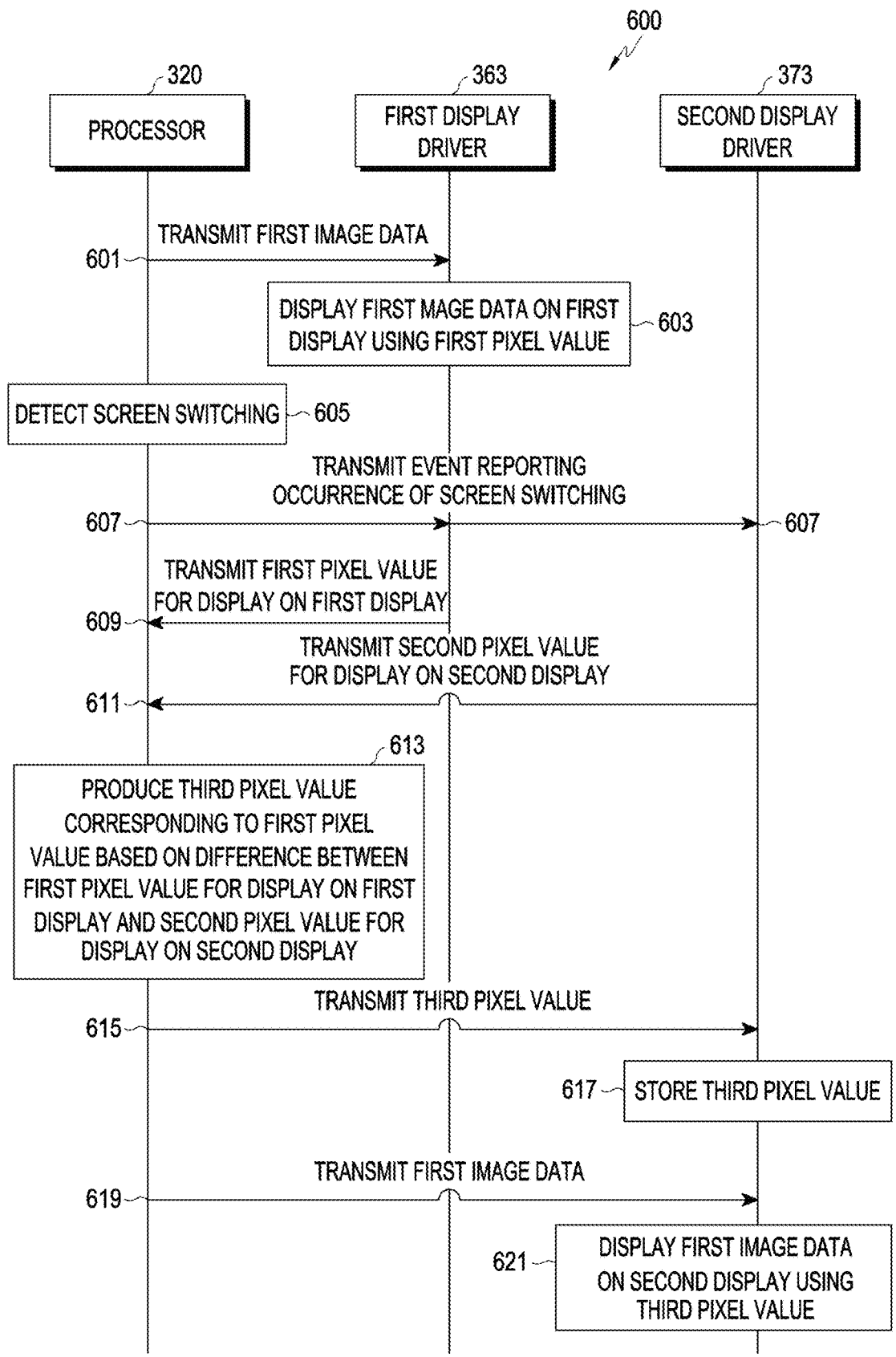
FIG. 6 is a flowchart illustrating an operation of calibrating pixel data by a processor of an electronic device according to various embodiments.

FIG. 6 is a flowchart 600 illustrating an operation of calibrating pixel data by a processor of an electronic device according to various embodiments. The operation of calibrating the pixel data may include operations 601 to 621, and it is construed that the calibration is performed by an electronic device (e.g., the electronic device 101 of FIG. 1 and the electronic device 301 of FIG. 3) or the processor of the electronic device 101 (e.g., the processor 120 of FIG. 1 or the processor 320 of the electronic device 301 of FIG. 3). According to an embodiment, at least one of operations 601 to 621 may be omitted, or some operations may be performed in a different order, or another operation may be further added.

In operation 601, the processor 320 (e.g., the processor 120 of FIG. 1) may transmit first image data to the first display driver 363.

According to an embodiment, if a user selects displaying of first image data on the first display 361, the processor 320 may transmit the first image data to the first display driver 363.

In operation 603, the first display driver 363 may display the first image data on the first display 361 using a first pixel value.

According to an embodiment, if the first display driver 363 receives the first image data from the processor 320, the first display driver 363 may detect the first pixel value for display on the first display, which is stored in the memory (e.g., the memory 233 of FIG. 2) of the first display device 360, and the first display driver 363 may display the first image data on the first display 361 using the first pixel value.

According to an embodiment, the first pixel value for display on the first display may be a value calibrated by applying a second calibration value to a pixel value capable of displaying image data on the first display 361 according to the damage of pixels of the first display 361.

According to an embodiment, the first pixel value for display on the first display may be received from the processor 320 at regular intervals and may be stored. The processor 320 may collect image data displayed on the first display 361 in units of pixels at regular intervals, may identify whether the image data collected in units of pixels is damaged, and if the damage of the image data collected in units of pixels is greater than or equal to a predetermined level, may transmit, to the first display driver 363, the first pixel value obtained via calibration by applying the second calibration value to a pixel value associated with the damage of the pixels of the first display 361 using a calibrating algorithm for a display device.

In operation 605, the processor 320 may detect screen switching.

According to an embodiment, the processor 320 may detect screen switching for displaying, on the second display 371, the first image data which is being displayed on the first display 361.

In operation 607, the processor 320 may transmit a report about the occurrence of an event (the report referred to herein as "an event reporting the occurrence of screen switching") to the first display driver 363 and the second display driver 373.

In operation 609, the first display driver 363 may transmit the first pixel value for display on the first display to the processor.

According to an embodiment, if the first display driver 363 receives the event reporting the occurrence of screen switching from the processor 320, the first display driver 363 may detect the first pixel value for display on the first display, which is stored in the memory of the first display device, and the first display driver 363 may transmit the detected first pixel value for display on the first display to the processor 320.

In operation 611, the second display driver 373 may transmit a second pixel value for display on the second display to the processor.

According to an embodiment, if the second display driver 373 receives the event reporting the occurrence of screen switching from the processor 320, the second display driver 373 may detect the second pixel value for display on the second display, which is stored in the memory of the second display device, and the second display driver 373 may transmit the detected second pixel value for display on the second display to the processor 320.

According to an embodiment, the second pixel value for display on the second display may be a value calibrated by applying the second calibration value to a pixel value capable of displaying image data on the second display 371 according to the damage of pixels of the second display 371.

According to an embodiment, the second pixel value for display on the second display may be received from the processor 320 at regular intervals and may be stored. The processor 320 may collect image data displayed on the second display 371 in units of pixels at regular intervals, may identify whether the image data collected in units of pixels is damaged, and if the damage of the image data collected in units of pixels is greater than or equal to a predetermined level, may transmit, to the second display driver 373, the second pixel value obtained via calibration by applying the second calibration value to a pixel value associated with the damage of the pixels of the second display 371 using a calibrating algorithm for a display device.

In operation 613, the processor 320 may produce a third pixel value corresponding to the first pixel value based on the difference between the first pixel value for display on the first display and the second pixel value for display on the second display.

According to an embodiment, the processor 320 may obtain the difference between the first pixel value for display on the first display, which is received from the first display driver 363, and the second pixel value for display on the second display, which is received from the second display driver 373, and may detect first color data (e.g., a sub-pixel) having the lowest color value in first data indicating the difference value. The processor 320 may produce a first calibration value based on the first data and the color value of the first color data, and the processor 320 may apply the first calibration value to the second pixel value for display on the second display so as to produce a third pixel value corresponding to the first pixel value for display on the first display.

In operation 615, the processor 320 may transmit the third pixel value to the second display driver 373.

In operation 617, the second display driver 373 may store the third pixel value.

According to an embodiment, the second display driver 373 may store the third pixel value received from the processor 320 in the memory of the second display device.

According to an embodiment, the second display driver 373 may store the third pixel value received from the processor 320 in the memory of the second display device.

In operation 619, the processor 320 may transmit the first image data to the second display driver 373.

In operation 621, the second display driver 373 may display the first image data on the second display using the third pixel value.

According to an embodiment, if the second display driver 373 receives the first image data from the processor 320, the second display driver 373 may detect the third pixel value stored in* the memory of the second display device, and the second display driver 373 may display the first image data on the second display using the third pixel value.

Figure 7:
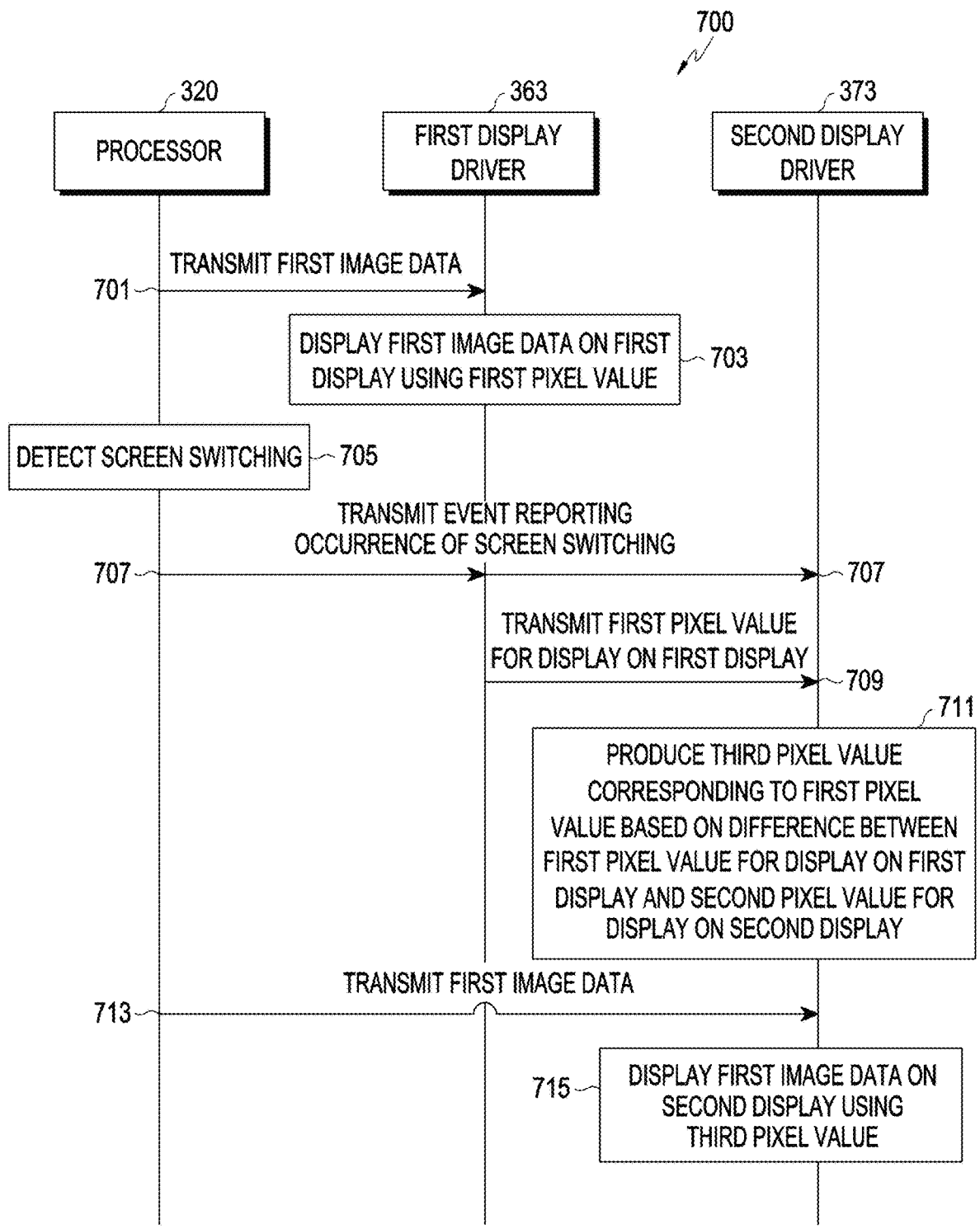
FIG. 7 is a flowchart illustrating an operation of calibrating pixel data by a display driver of an electronic device according to various embodiments.

FIG. 7 is a flowchart 700 illustrating an operation of calibrating pixel data by a display driver of an electronic device according to various embodiments. The operation of calibrating the image data may include operations 701 to 715, and it is construed that the calibration is performed by an electronic device (e.g., the electronic device 101 of FIG. 1 and the electronic device 301 of FIG. 3) or the processor of the electronic device 101 of FIG. 1 (e.g., the processor 120 of FIG. 1 or the processor 320 of the electronic device 301 of FIG. 3). According to an embodiment, at least one of operations 701 to 715 may be omitted, or some operations may be performed in a different order, or another operation may be further added.

In operation 701, the processor 320 (e.g., the processor 120 of FIG. 1) may transmit first image data to the first display driver 363.

According to an embodiment, if a user selects displaying of first image data on the first display 361, the processor 320 may transmit the first image data to the first display driver 363.

In operation 703, the first display driver 363 may display the first image data on the first display 361 using a first pixel value.

According to an embodiment, if the first display driver 363 receives the first image data from the processor 320, the first display driver 363 may detect a first pixel value for display on the first display, which is stored in the memory (e.g., the memory 233 of FIG. 2) of the first display device 360, and the first display driver 363 may display the first image data on the first display 361 using the first pixel value.

According to an embodiment, the first pixel value for display on the first display may be a value calibrated by applying a second calibration value to a pixel value capable of displaying image data on the first display 361 according to the damage of pixels of the first display 361.

According to an embodiment, the first pixel value for display on the first display may be received from the processor 320 at regular intervals and may be stored. The processor 320 may collect image data displayed on the first display 361 in units of pixels at regular intervals, may identify whether the image data collected in units of pixels is damaged, and if the damage of the image data collected in units of pixels is greater than or equal to a predetermined level, may transmit, to the first display driver 363, the first pixel value obtained via calibration by applying the second calibration value to a pixel value associated with the damage of the pixels of the first display 361 using a calibrating algorithm for a display device.

In operation 705, the processor 320 may detect screen switching.

According to an embodiment, the processor 320 may detect screen switching for displaying, on the second display 371, the first image data which is being displayed on the first display 361.

In operation 707, the processor 320 may transmit an event reporting the occurrence of screen switching to the first display driver 363 and the second display driver 373.

In operation 709, the first display driver 363 may transmit the first pixel value for display on the first display to the second display driver 373.

According to an embodiment, if the first display driver 363 receives the event reporting the occurrence of screen switching from the processor 320, the first display driver 363 may detect the first pixel value for display on the first display, which is stored in the memory of the first display device, and the first display driver 363 may transmit the detected first pixel value for display on the first display to the second display driver 373.

In operation 711, the second display driver 373 may produce a third pixel value corresponding to the first pixel value based on the difference between the first pixel value for display on the first display and a second pixel value for display on the second display.

According to an embodiment, if the second display driver 373 receives the event reporting the occurrence of screen switching from the processor 320, the second display driver 373 may detect the second pixel value for display on the second display, which is stored in the memory of the second display device.

According to an embodiment, the second pixel value for display on the second display may be a value calibrated by applying a second calibration value to a pixel value capable of displaying image data on the second display 371 according to the damage of pixels of the second display 371.

According to an embodiment, the second pixel value for display on the second display may be received from the processor 320 at regular intervals and may be stored. The processor 320 may collect image data displayed on the second display 371 in units of pixels at regular intervals, may identify whether the image data collected in units of pixels is damaged, and if the damage of the image data collected in units of pixels is greater than or equal to a predetermined level, may transmit, to the second display driver 373, the second pixel value obtained via calibration by applying the second calibration value to a pixel value associated with the damage of the pixels of the second display 371 using a calibrating algorithm for a display device.

According to an embodiment, the second display driver 373 may obtain the difference between the first pixel value for display on the first display, which is received from the first display driver 363, and the second pixel value for display on the second display, which is stored in the memory of the second display driver 373, and may obtain first color data (e.g., a sub-pixel) having the lowest color value in first data indicating the difference value. The second display driver 373 may produce a first calibration value based on the first data and the color value of the first color data, may apply the first calibration value to the second pixel value for display on the second display so as to produce the third pixel value corresponding to the first pixel value for display on the first display, and may store the third pixel value in the memory of the second display device.

In operation 713, the processor 320 may transmit the first image data to the second display driver.

In operation 715, the second display driver 373 may display the first image data on the second display using the third pixel value.

According to an embodiment, if the second display driver 373 receives the first image data from the processor 320, the second display driver 373 may detect the third pixel value stored in the memory of the second display device, and the second display driver may display the first image data on the second display using the third pixel value.

Figure 8:
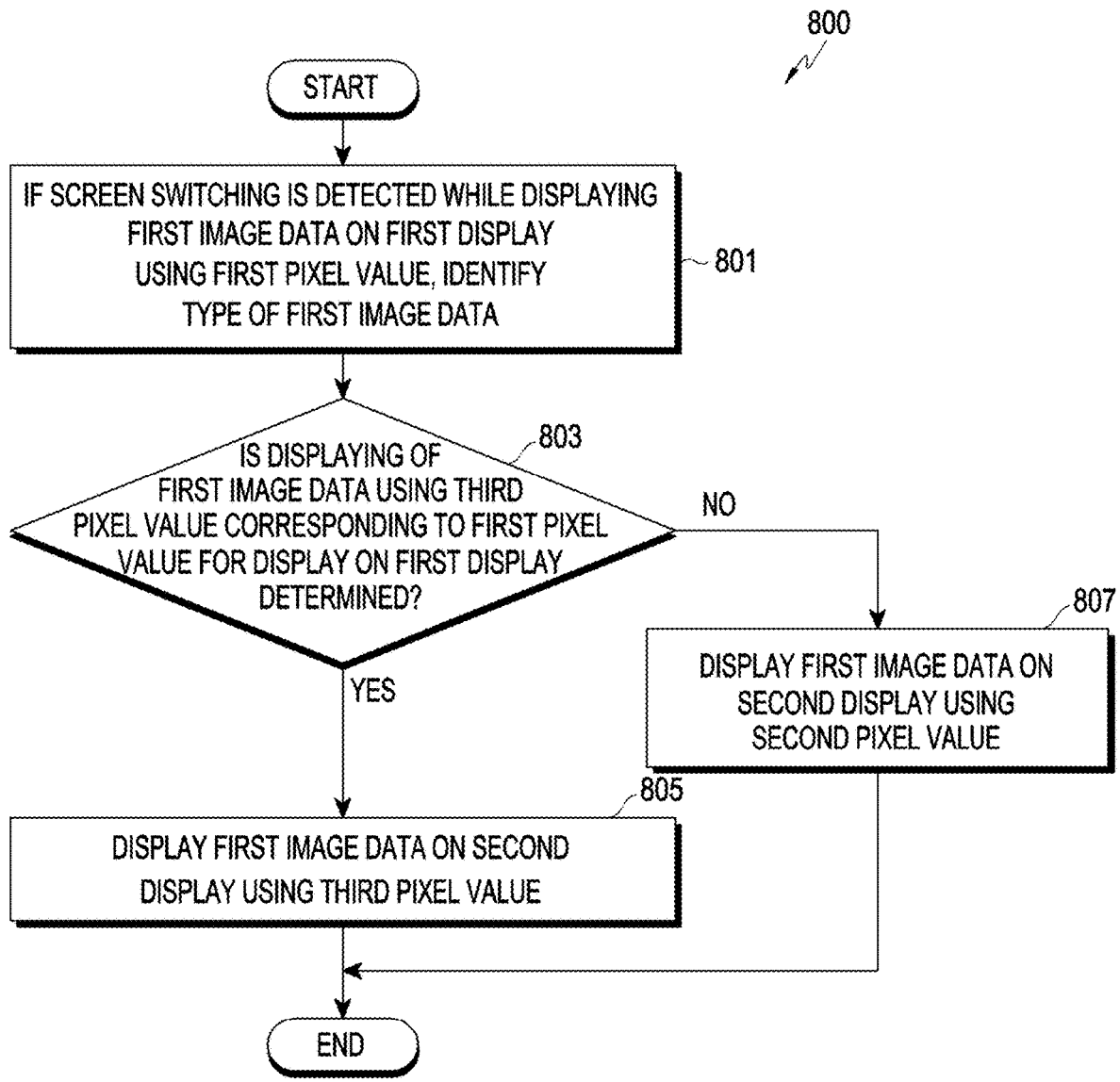
FIG. 8 is a flowchart illustrating an operation of calibrating pixel data by an electronic device according to various embodiments.

FIG. 8 is a flowchart 800 illustrating an operation of calibrating pixel data by an electronic device according to various embodiments. The operation of calibrating the image data may include operations 801 to 807, and it is construed that the calibration is performed by an electronic device (e.g., the electronic device 101 of FIG. 1 and the electronic device 301 of FIG. 3) or the processor of the electronic device 101 of FIG. 1 (e.g., the processor 120 of FIG. 1 or the processor 320 of the electronic device 301 of FIG. 3). According to an embodiment, at least one of operations 801 to 807 may be omitted, or some operations may be performed in a different order, or another operation may be further added.

In operation 801, if the electronic device (e.g., the electronic device 101 of FIG. 1 and the electronic device 301 of FIG. 3) detects screen switching, while displaying first image data on a first display (e.g., the first display 361 of FIG. 3) using a first pixel value, the electronic device may identify the type of the first image data.

According to an embodiment, based on the type of the first image data displayed on the first display, the electronic device may determine whether to display the first image data on a second display (e.g., the second display 371 of FIG. 3) using a third pixel value corresponding to the first pixel value for display on the first display, or to display the first image data using a second pixel value for display on the second display.

If the electronic device (e.g., the electronic device 101 of FIG. 1 and the electronic device 301 of FIG. 3) determines to display the first image data using the third pixel value corresponding to the first pixel value for display on the first display in operation 803, the electronic device (the electronic device 101 of FIG. 1 and the electronic device 301 of FIG. 3) may display the first image data on the second display (e.g., the second display 371 of FIG. 3) using the third pixel value in operation 805.

According to an embodiment, if the electronic device produces the third pixel value corresponding to the first pixel value based on the difference between the first pixel value for display on the first display and the second pixel value for display on the second display, the electronic device may display the first image data on the second display using the third pixel value.

According to an embodiment, if the first image data is identified as image data (e.g., gallery application, photo data, or video data) or image data of an application, which does not have a big change in the color sense, the electronic device may display the first image data on the second display using the third pixel value corresponding to the first pixel value for display on the first display.

In operation 803, if the electronic device (e.g., the electronic device 101 of FIG. 1 and the electronic device 301 of FIG. 3) determine not to display the first image data using the third pixel value corresponding to the first pixel value for display on the first display, the electronic device (the electronic device 101 of FIG. 1 and the electronic device 301 of FIG. 3) may display the first image data on the second display (e.g., the second display 371 of FIG. 3) using the second pixel value in operation 807.

According to an embodiment, the electronic device may detect the second pixel value for display on the second display, which is stored in the memory of the second display device (e.g., the second display device 370 of FIG. 3), and may display the first image data on the second display using the second pixel value.

According to an embodiment, if the type of the first image data is identified as not image data or image data of an application that is capable of being displayed using the third pixel value, the electronic device may display the first image data on the second display using the second pixel value for display on the second display.

According to various embodiments, a method of calibrating pixel data by an electronic device may include: an operation of detecting, by a processor of the electronic device, screen switching while displaying first image data on a first display, wherein the displaying of the first image data on the first display includes using a first pixel value; an operation of in response to the detection, producing, by the processor, a first calibration value based on a difference between a first pixel value for display on a first display and a second pixel value for display on a second display; an operation of producing, by the processor, a third pixel value corresponding to the first pixel value by applying the first calibration value to the second pixel value; and an operation of controlling, by the processor, the second display driver 373, so as to display the first image data on the second display using the third pixel value.

According to various embodiments, the method may further include: in response to the second display driver receiving an event reporting the screen switching, the first image data, and the third pixel value from the processor, an operation of displaying, by the second display driver, the first image data on the second display using the third pixel value.

According to various embodiments, the method may further include: in response to the processor detecting the screen switching, an operation of receiving, by the processor, the first pixel value for display on the first display from the first display driver; and an operation of receiving, by the processor, the second pixel value for display on the second display from the second display driver.

According to various embodiments, the first pixel value for display on the first display may be a value calibrated by applying a second calibration value to a pixel value capable of displaying image data in the first display according to a damage of pixels included in the first display; and the second pixel value for display on the second display may be a value calibrated by applying the second calibration value to a pixel value capable of displaying image data in the second display according to a damage of pixels included in the second display.

According to various embodiments, the operation of producing of the first calibration value may include: an operation of producing, by the processor, first data including the difference value between the first pixel value for display on the first display and the second pixel value for display on the second display; an operation of detecting, by the processor, first color data having the lowest color value in color data included in the first data; and an operation of producing, by the processor, the first calibration value using the first data and the color value of the first color data.

According to various embodiments, the method may further include: an operation of producing a first calibration value based on a difference between the first pixel value for display on the first display and the second pixel value for display on the second display, in response to receiving: from the processor, an event reporting the screen switching and the first image data; and from the first display driver, the first pixel value for display on the first display; an operation of producing, by the second display driver, a third pixel value corresponding to the first pixel value by applying the first calibration value to the second pixel value for display on the second display; and an operation of displaying, by the second display driver, the first image data on the second display using the third pixel value.

According to various embodiments, the method may further include: in response to the first display driver receives receiving, from the processor, an event reporting the screen switching from the processor, an operation of transmitting, by the first display driver, the first pixel value for display on the first display to the second display driver.

According to various embodiments, the operation of producing the first calibration value may include: an operation of producing, by the second display driver, first data indicating a difference value between the first pixel value for display on the first display and the second pixel value for display on the second display; an operation of detecting, by the second display driver, first color data having the lowest color value among color data included in the first data; and an operation of producing, by the second display driver, the first calibration value using the first data and the color value of the first color data.

According to various embodiments, the method may further include: in response to the processor detecting detects the screen switching, an operation of determining, by the processor, whether to display the first image data using the third pixel value based on a type of the first image data; and in response to the processor identifies identifying that the first image data corresponds to a type of data or a type of application capable of being displayed using the third pixel value, an operation of displaying, by the processor, the first image data on the second display using the third pixel value.

According to various embodiments, the method may further include: in response to the processor identifies identifying that the first image data does not correspond to a type of data or a type of application capable of being displayed using the third pixel value, an operation of displaying, by the processor, the first image data on the second display using the second pixel value for display on the second display.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., via wire), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least some of the instructions stored in the storage medium and execute the instructions. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Although the present disclosure has been described with various embodiments, various changes and modifications may be suggested to one skilled in the art. It is intended that the present disclosure encompass such changes and modifications as fall within the scope of the appended claims.

What is claimed is:

1. An electronic device comprising:
a first display driver configured to control a first display;
a second display driver configured to control a second display; and
a processor configured to:
detect screen switching while displaying first image data on the first display, wherein the displaying of the first image data on the first display includes using a first pixel value;
in response to the detection, produce a first calibration value based on a difference between the first pixel value for display on the first display and a second pixel value for display on the second display;
produce a third pixel value corresponding to the first pixel value by applying the first calibration value to the second pixel value; and
control the second display driver so as to display the first image data on the second display using the third pixel value.

2. The electronic device of claim 1, wherein the second display driver is configured to:
in response to receiving, from the processor, an event reporting the screen switching, the first image data, and the third pixel value, display the first image data on the second display using the third pixel value.

3. The electronic device of claim 1, wherein the processor is configured to:
in response to detecting the screen switching, receive the first pixel value for display on the first display from the first display driver; and
receive the second pixel value for display on the second display from the second display driver.

4. The electronic device of claim 1, wherein the first pixel value for display on the first display is a value calibrated by applying a second calibration value to a pixel value capable of displaying image data on the first display according to a damage of pixels included in the first display; and
the second pixel value for display on the second display is a value calibrated by applying the second calibration value to a pixel value capable of displaying image data on the second display according to a damage of pixels included in the second display.

5. The electronic device of claim 1, wherein the processor is configured to:
produce first data including a difference value between the first pixel value for display on the first display and the second pixel value for display on the second display;
detect first color data having a lowest color value among color data included in the first data; and
produce the first calibration value using the first data and the color value of the first color data.

6. The electronic device of claim 1, wherein the second display driver is configured to:
produce a first calibration value based on a difference between the first pixel value for display on the first display and the second pixel value for display on the second display, in response to receiving:
from the processor, an event reporting the screen switching and the first image data; and
from the first display driver, the first pixel value for display on the first display;
produce a third pixel value corresponding to the first pixel value by applying the first calibration value to the second pixel value for display on the second display; and
display the first image data on the second display using the third pixel value.

7. The electronic device of claim 6, wherein the first display driver is configured to in response to receiving, from the processor, the event reporting the screen switching, transmit the first pixel value for display on the first display to the second display driver.

8. The electronic device of claim 6, wherein the second display driver is configured to:
produce first data indicating a difference value between the first pixel value for display on the first display and the second pixel value for display on the second display;
detect first color data having a lowest color value among color data included in the first data; and
produce the first calibration value using the first data and the color value of the first color data.

9. The electronic device of claim 1, wherein the processor is configured to:
in response to detecting the screen switching, determine, based on a type of the first image data, whether to display the first image data using the third pixel value; and
in response to identifying the first image data as a type of data or a type of application that is capable of being displayed using the third pixel value, display the first image data on the second display using the third pixel value.

10. The electronic device of claim 9, wherein the processor is configured to: in response to identifying the first image data is identified as not a type of data or a type of application that is capable of being displayed using the third pixel value, display the first image data on the second display using the second pixel value for display on the second display.

11. A method of calibrating pixel data by an electronic device, the method comprising:
detecting, by a processor of the electronic device, screen switching while displaying first image data on a first display associated with a first display driver, wherein the displaying of the first image data on the first display includes using a first pixel value;
in response to the detection, producing, by the processor, a first calibration value based on a difference between a first pixel value for display on a first display and a second pixel value for display on a second display;
producing, by the processor, a third pixel value corresponding to the first pixel value by applying the first calibration value to the second pixel value; and
controlling, by the processor, a second display driver, so as to display the first image data on the second display using the third pixel value.

12. The method of claim 11, further comprising:
in response to the second display driver receiving an event reporting the screen switching, the first image data, and the third pixel value from the processor displaying, by the second display driver, the first image data on the second display using the third pixel value.

13. The method of claim 11, further comprising:
in response to the processor detecting the screen switching, receiving, by the processor, the first pixel value for display on the first display from the first display driver; and
receiving, by the processor, the second pixel value for display on the second display from the second display driver.

14. The method of claim 11, wherein the first pixel value for display on the first display is a value calibrated by applying a second calibration value to a pixel value capable of displaying image data on the first display according to a damage of pixels included in the first display; and the second pixel value for display on the second display is a value calibrated by applying the second calibration value to a pixel value capable of displaying image data on the second display according to a damage of pixels included in the second display.

15. The method of claim 11, wherein the producing of the first calibration value comprises:
producing, by the processor, first data including the difference value between the first pixel value for display on the first display and the second pixel value for display on the second display;
detecting, by the processor, first color data having a lowest color value among color data included in the first data; and
producing, by the processor, the first calibration value using the first data and the color value of the first color data.

16. The method of claim 11, further comprising:
producing a first calibration value based on a difference between the first pixel value for display on the first display and the second pixel value for display on the second display, in response to receiving:
from the processor, an event reporting the screen switching and the first image data; and
from the first display driver, the first pixel value for display on the first display;
producing, by the second display driver, a third pixel value corresponding to the first pixel value by applying the first calibration value to the second pixel value for display on the second display; and
displaying, by the second display driver, the first image data on the second display using the third pixel value.

17. The method of claim 16, further comprising:
in response to the first display driver receives receiving, from the processor, an event reporting the screen switching from the processor, transmitting, by the first display driver, the first pixel value for display on the first display to the second display driver.

18. The method of claim 16, wherein the producing of the first calibration value comprises:
producing, by the second display driver, first data indicating a difference value between the first pixel value for display on the first display and the second pixel value for display on the second display;
detecting, by the second display driver, first color data having a lowest color value in among color data included in the first data; and
producing, by the second display driver, the first calibration value using the first data and the color value of the first color data.

19. The method of claim 11, further comprising:
in response to the processor detecting detects the screen switching, determining, by the processor, whether to display the first image data using the third pixel value based on a type of the first image data; and
in response to the processor identifies identifying that the first image data corresponds to a type of data or a type of application capable of being displayed using the third pixel value, displaying, by the processor, the first image data on the second display using the third pixel value.

20. The method of claim 19, further comprising:
in response to the processor identifies identifying that the first image data does not correspond to a type of data or a type of application capable of being displayed using the third pixel value, displaying, by the processor, the first image data on the second display using the second pixel value for display on the second display.

\* \* \* \* \*